(12) United States Patent
Jayadevan et al.

(10) Patent No.: US 8,756,515 B2
(45) Date of Patent: Jun. 17, 2014

(54) DYNAMIC EDITORS FOR FUNCTIONALLY COMPOSED UI

(75) Inventors: Siddharth Jayadevan, Seattle, WA (US); Christopher Donald Hackmann, Redmond, WA (US); Stephen M. Danton, Seattle, WA (US); Simon David Kent, Redmond, WA (US); Michael Charles Murray, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 253 days.

(21) Appl. No.: 12/637,353

(22) Filed: Dec. 14, 2009

(65) Prior Publication Data

US 2011/0119605 A1 May 19, 2011

Related U.S. Application Data

(60) Provisional application No. 61/261,701, filed on Nov. 16, 2009.

(51) Int. Cl.
*G06F 3/048* (2013.01)
*G06F 3/00* (2006.01)

(52) U.S. Cl.
USPC ............ 715/763; 715/758; 715/764; 715/810

(58) Field of Classification Search
USPC ........................................ 715/810, 764, 763
See application file for complete search history.

(56) References Cited

U.S. PATENT DOCUMENTS

| | | | |
|---|---|---|---|
| 5,347,627 A | 9/1994 | Hoffmann et al. | |
| 5,652,884 A | 7/1997 | Palevich | |
| 7,188,340 B2 | 3/2007 | Ostertag et al. | |
| 7,584,420 B2 * | 9/2009 | Gaug et al. | 715/234 |
| 7,818,736 B2 * | 10/2010 | Appavoo et al. | 717/168 |
| 7,904,809 B2 * | 3/2011 | Corning et al. | 715/259 |
| 7,979,796 B2 * | 7/2011 | Williams et al. | 715/700 |

(Continued)

FOREIGN PATENT DOCUMENTS

EP 0622729 A3 11/1994

OTHER PUBLICATIONS

Xiaohiu, et al.—Research and Implement of Tree Structure Based Graphic User Interface Editor—Published Date: 2008 http://ieeexplore.ieee.org/stamp/stamp.jsp?tp=&isnumber=&arnumber=4590250.

(Continued)

*Primary Examiner* — Amy Ng
*Assistant Examiner* — Erik Stitt
(74) *Attorney, Agent, or Firm* — Nicholas Chen; Brian Haslam; Micky Minhas (57) ABSTRACT

In an embodiment, a computer system instantiates a real-time incremental editor configured to receive editing inputs that are to be applied to data of a data model, where the data model data declaratively defines a UI model that drives the behavior of a corresponding UI based on the UI model. The computer system receives an editing input from a user indicating one or more desired edits that are to be made to the UI and determines, based on the received editing inputs, which changes are to be made to the data model data to enact the desired changes in the UI. The computer system updates the UI in real-time based on the determined edits to the data model data and presents the updated UI in real-time without losing state information in the resultant UI.

19 Claims, 5 Drawing Sheets

(56) References Cited

U.S. PATENT DOCUMENTS

| | | |
|---|---|---|
| 7,979,847 B2* | 7/2011 | Danton et al. ............... 717/125 |
| 2006/0106897 A1 | 5/2006 | Sapozhnikov et al. |
| 2006/0248112 A1* | 11/2006 | Williams et al. ............ 707/102 |
| 2006/0248448 A1* | 11/2006 | Williams et al. ............ 715/513 |
| 2008/0195649 A1* | 8/2008 | Lefebvre ...................... 707/102 |
| 2009/0112570 A1* | 4/2009 | Williams et al. .............. 703/23 |
| 2009/0288069 A1* | 11/2009 | Kent et al. ................... 717/121 |
| 2011/0026898 A1* | 2/2011 | Lussier et al. .............. 386/280 |

OTHER PUBLICATIONS

Frank, et al.—Model-Based User Interface Design by Example and by Interview—Published Date: 1993 http://www.marofra.com/oldhomepage/Papers/uist93.pdf.

Author Unknown—Customize Tab (Customize User Interface Editor)—Retrieved Date: Oct. 27, 2009 http://docs.autodesk.com/ACD/2010/ENU/AutoCAD%202010%20User%20Documentation/index.html?url=WS1a9193826455f5ffa23ce210c4a30acaf-4cdf.htm,topicNumber=d0e215388.

* cited by examiner

DYNAMIC EDITORS FOR FUNCTIONALLY COMPOSED UI

CROSS-REFERENCE TO RELATED APPLICATIONS

This application claims priority to and is a non-provisional application of U.S. patent application Ser. No. 61/261,701 filed Nov. 16, 2009, entitled "DYNAMIC EDITORS FOR FUNCTIONALLY COMPOSED UI", and hereby expressly incorporates the entire contents of that application.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with or even design other software applications. For instance, integrated development environments can be used by developers to write and debug software applications. Some of these environments are specialized for designing software application user interfaces. These specialized user interface designers are often configured to provide a what-you-see-is-what-you-get (WYSIWYG) design experience. Using such a designer, a developer may simply drag and drop user interface (UI) elements onto the UI that is being designed, and the specialized UI designer application will write the software code corresponding to the user's drag and drop actions.

BRIEF SUMMARY

The present invention extends to methods, systems, and computer program products for providing a real-time incremental editor for enacting changes on a user interface (UI) and presenting a preview of the potential results of a user edit to data model data. A computer system instantiates a real-time incremental editor configured to receive editing inputs that are to be applied to data of a data model, where the data model data declaratively defines a UI model that drives the behavior of a corresponding UI based on the UI model. The computer system receives an editing input from a user indicating one or more desired edits that are to be made to the UI and determines, based on the received editing inputs, which changes are to be made to the data model data to enact the desired changes in the UI. The computer system updates the UI in real-time based on the determined edits to the data model data and presents the updated UI in real-time without losing state information in the resultant UI.

In another embodiment, a computer system instantiates a real-time incremental editor configured to receive editing inputs that are to be applied to data of a data model, where the data model data declaratively defines a UI model that drives the behavior of a corresponding UI based on the UI model. The computer system receives an input from a user at the instantiated editor, where the input indicates various edits that are to be applied to a running software application. The computer system determines, based on the received user input, which changes are to be made to the data model data to enact the desired changes in the running software application and previews the determined changes in real-time on the running application.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for providing a real-time incremental editor for enacting changes on a user interface (UI) and presenting a preview of the potential results of a user edit to data model data. A computer system instantiates a real-time incremental editor configured to receive editing inputs that are to be applied to data of a data model, where the data model data declaratively defines a UI model that drives the behavior of a corresponding UI based on the UI model. The computer system receives an editing input from a user indicating one or more desired edits that are to be made to the UI and determines, based on the received editing inputs, which changes are to be made to the data model data to enact the desired changes in the UI. The computer system updates the UI in real-time based on the determined edits to the data model data and presents the updated UI in real-time without losing state information in the resultant UI.

In another embodiment, a computer system instantiates a real-time incremental editor configured to receive editing inputs that are to be applied to data of a data model, where the data model data declaratively defines a UI model that drives the behavior of a corresponding UI based on the UI model. The computer system receives an input from a user at the instantiated editor, where the input indicates various edits that are to be applied to a running software application. The computer system determines, based on the received user input, which changes are to be made to the data model data to enact the desired changes in the running software application and previews the determined changes in real-time on the running application.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions, computer program products and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
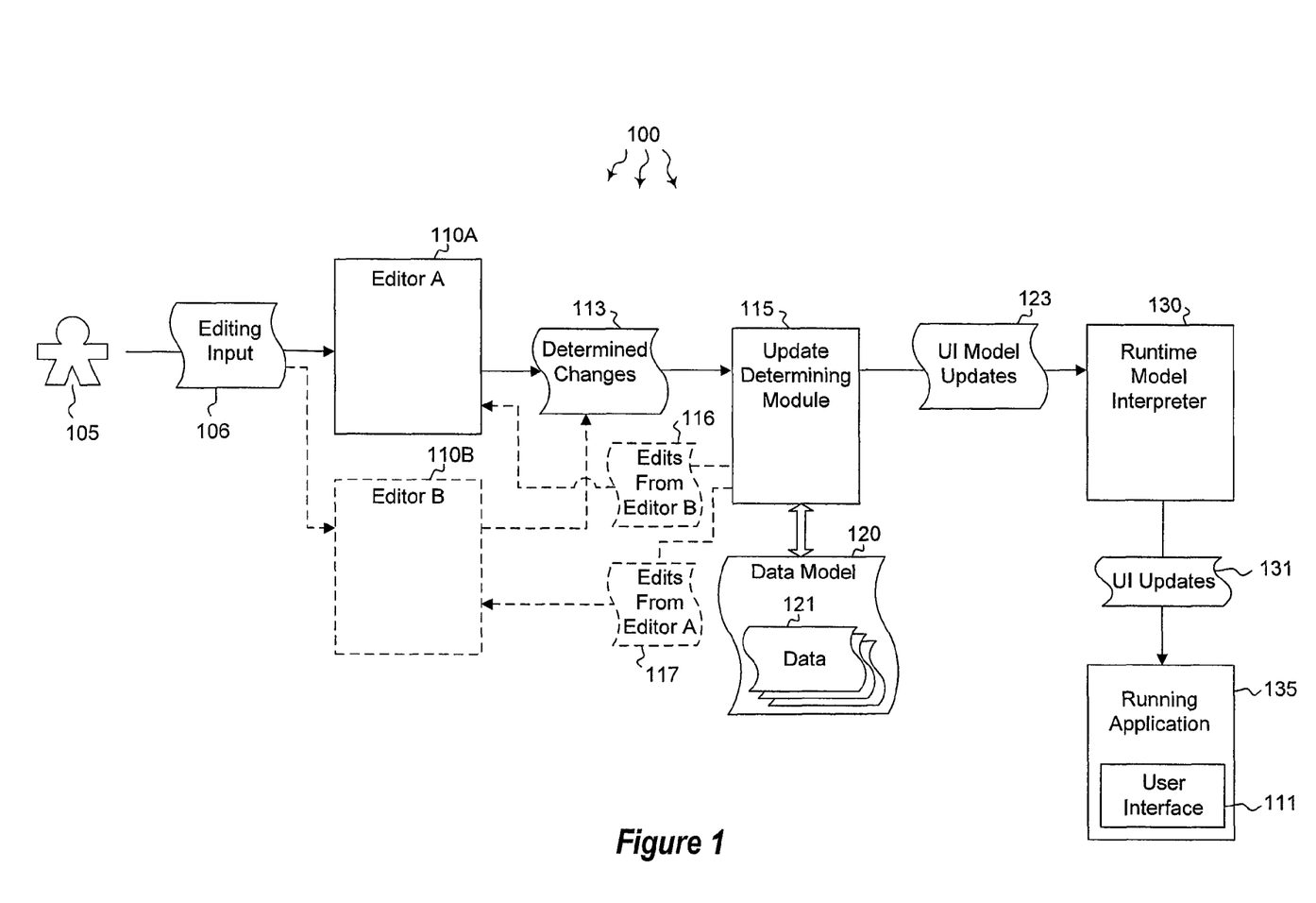
FIG. 1 illustrates a computer architecture in which embodiments of the present invention may operate including providing a real-time incremental editor for enacting changes on a user interface (UI) and presenting a preview of the potential results of a user edit to data model data.

FIG. 1 illustrates a computer architecture 100 in which the principles of the present invention may be employed. Computer architecture 100 includes editors A and B (110A and 110B, respectively). In some embodiments, only one editor may be used. In other embodiments, two or more editors may be used. Editors, as used herein, may refer to development environments in which a software developer may design or otherwise construct a software application or element thereof. The editors may comprise all different types of editors including text editors, graphical editors (e.g. tree/diagram editors) and other types of editors. The editors may provide a textual, graphical or other representation of a model. This model may be used as the basis for a software application (e.g. running application 135) or for the software application's user interface (111). Thus, in some cases, a developer may use an editor (e.g. 110A) to design or edit a model that forms the basis of user interface 111.

During UI development, the developer (or more generically, user 105) may desire to make changes to the UI of running application 135. Thus, user 105 provides editing inputs 106 which, when applied, will alter the UI. These editing inputs are received by the editor(s) and are processed to determine which changes are to be made to the UI to bring about the desired result. Here it should be noted that UI 111 may be a data-driven interface. Accordingly, the UIs may have a UI model which is based on a data model (e.g. model 120). Such data-driven interfaces may be changed in real-time (or essentially real-time) by changing the data (121) of the data model (120). Thus, update determining module 115 may be used to determine, based on the received determined changes 113 from the editor, which changes are to be made to the data to bring about the desired changes in the UI.

Update determining module 115 may also be configured to propagate any changes or edits made to editor A (110A) by user 105 to editor B (110B), and vice versa. Thus, edits from editor B 116 may be propagated to editor A and edits from editor A 117 may be propagated to editor B. In cases where other editors exist, edits may also be propagated to the other editors. The propagation of edits may occur because of a two-way binding between the update determining module 115 (a data flow engine in some embodiments) and the editors.

Upon determining which data changes are to be made to data model 120, update determining module 115 may output the UI model updates 123 that are to be made to the UI (111) of running application 135. Runtime model interpreter may receive the UI model updates and, in real-time, output the actual UI changes or updates 131 that are to be made to the UI. Thus, in this manner, UI 111 is updated dynamically, in real-time based on the editing inputs provided by the user 105. The changes may be viewed within the editor as the UI is altered based on the runtime model interpreter's outputs. These steps will be explained in greater detail below with regard to methods 200 of FIGS. 2 and 300 of FIG. 3.

Figure 2:
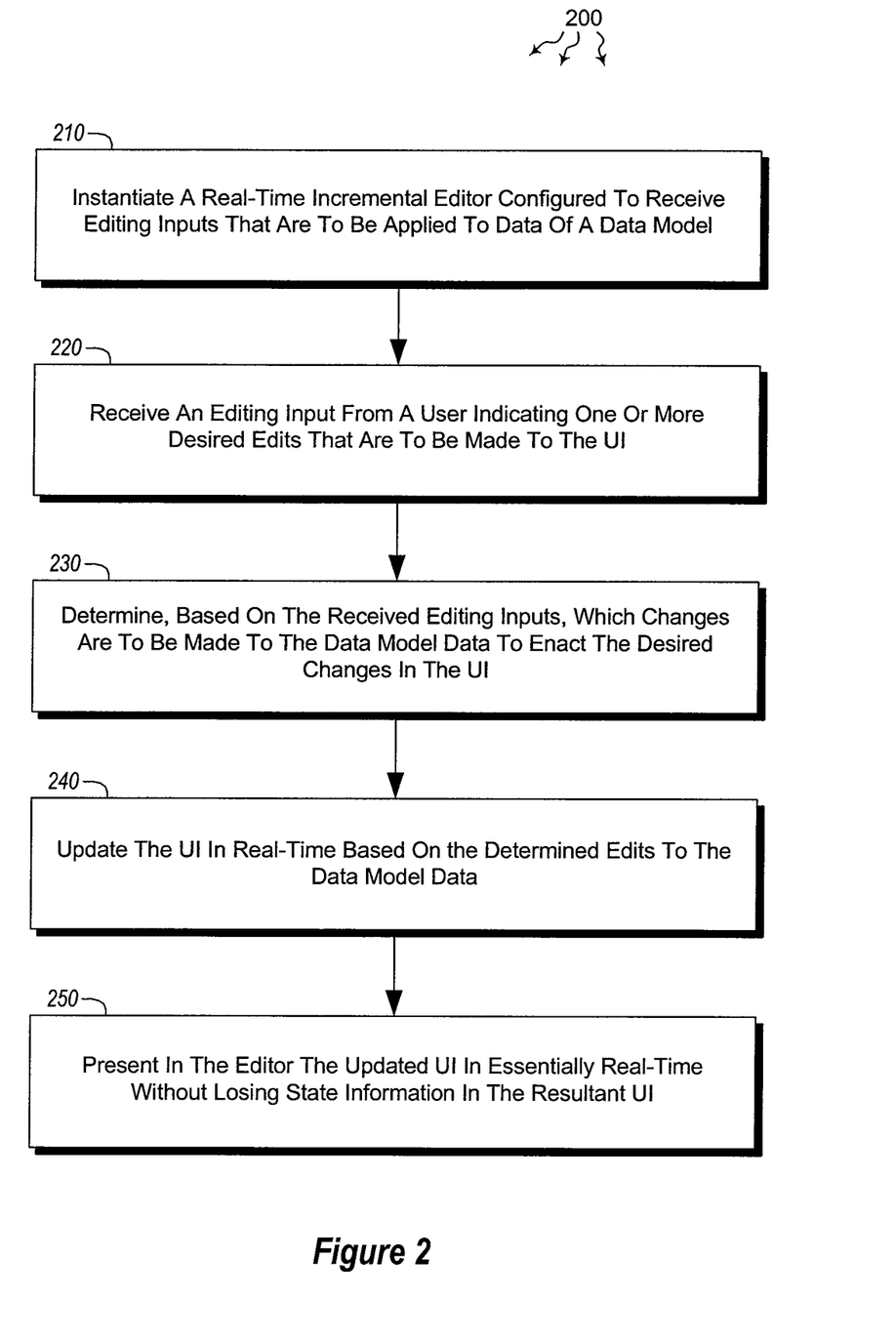
FIG. 2 illustrates a flowchart of an example method for providing a real-time incremental editor for enacting changes on a user interface (UI).
Figure 3:
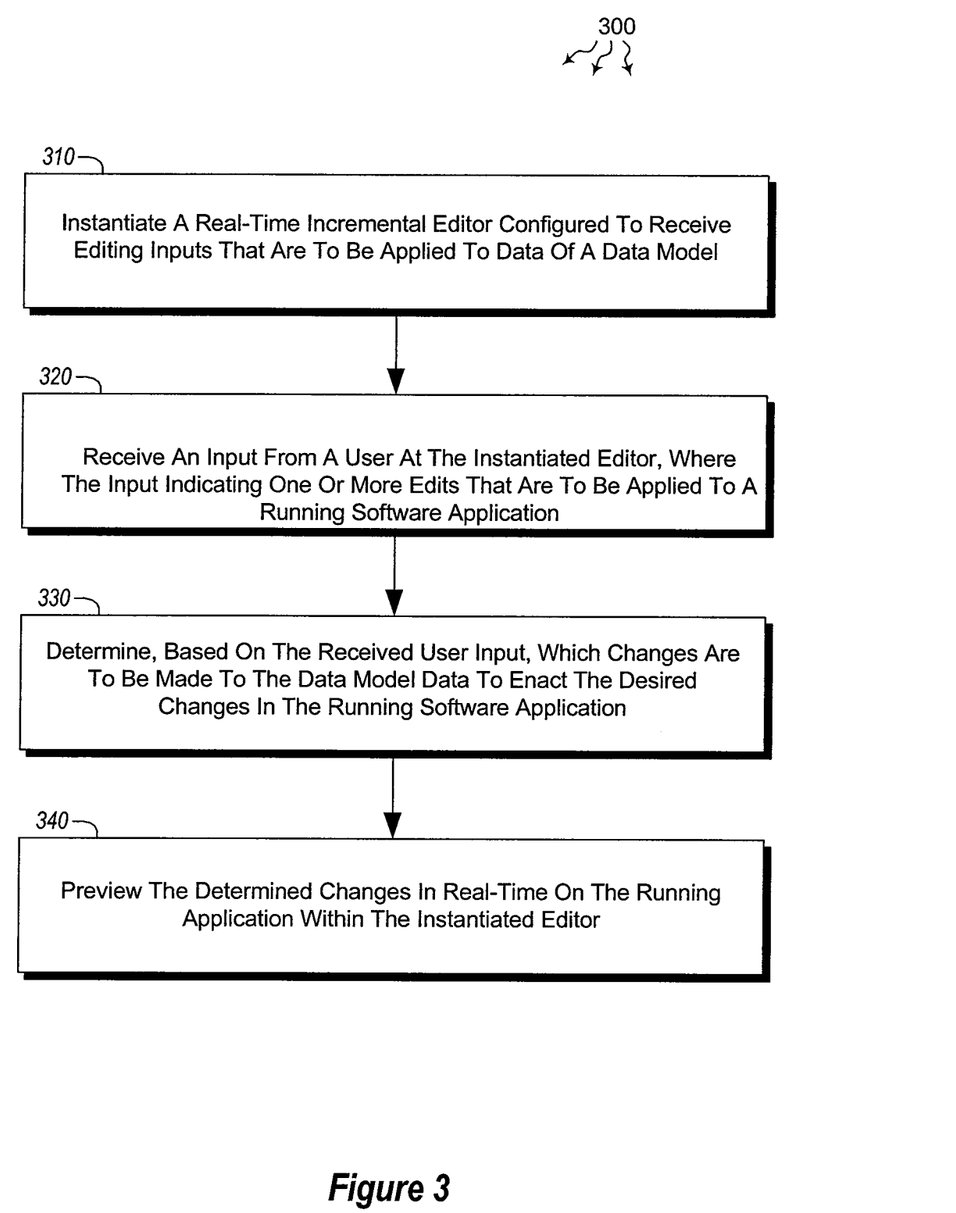
FIG. 3 illustrates a flowchart of an example method for presenting a preview of the potential results of a user edit to data model data.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for providing a real-time incremental editor for enacting changes on a user interface (UI). The method 200 will now be described with frequent reference to the components and data of environments 100 of FIG. 1 and 400 of FIG. 4.

Method 200 includes an act of instantiating a real-time incremental editor configured to receive editing inputs that are to be applied to data of a data model, wherein the data model data declaratively defines a UI model that drives the behavior of a corresponding UI based on the UI model (act 210). For example, a computer system may instantiate real-time incremental editor 110A which is configured to receive editing inputs 106 that are to be applied to data 121 of data model 120. Data model data 121 declaratively defines a UI model that drives the behavior of UI 111 which is based on the UI model. As used herein, declaratively defining a model refers to allowing the user to design or specify the model using data, and not rigid logic. That data can then be analyzed and interpreted in real-time without needing to be compiled first. Accordingly, by having data model data 121 that declaratively defines a model, simple changes to the data model data can be applied in real-time without having to recompile or even stop a running software application that is based on the data model.

In some cases, data model 120 may be structured according to a schema. This may be referred to herein as a schematized model. Data model 120 may include many different types of data. This data may be stored in a local data store or may be stored remotely, perhaps even on a number of different computer systems such as on a storage area network (SAN). In some embodiments, data model data 121 may be divided into chunks. These chunks may be based on corresponding portions of a UI tree. For instance, a UI tree that has multiple different elements as part of the tree, may have a chunk of data corresponding to each element of the tree. In some cases, these chunks may comprise text chunks. The text chunks may be structured such that data model (schema) grammar that defines how the data 121 is to be structured is not violated. Accordingly, in such cases, bad or improperly functioning states may be avoided as the text chunks are structured in such a way as to prevent schema grammar violations.

In cases where data model data 121 is divided into text chunks, a two-way data binding may be applied between a textual editor view and the text chunks of the data model data, such that any edits to the data model data cause the textual editor to update automatically. Accordingly, in instances where editor A is a textual editor, editor A may have a two-way data binding between itself and the text chunks of the data model data 121. In such cases, any edits made to data model data 121 (e.g. as a result of editing inputs 106) cause the textual editor (editor A) to update automatically.

Method 200 includes an act of receiving an editing input from a user indicating one or more desired edits that are to be made to the UI (act 220). For example, editor A (110A) may receive editing input 106 from user 105 indicating one or more desired edits that are to be made to the UI. These edits may comprise text edits, graphical edits or any other type of changes or modifications that can be made to UI 111. Editor A may be configured to output determined changes 113 indicating the editor's interpretation of the user's editing inputs. For instance, if user 105 indicates in editing input 106 that a diagram element is to be changed, the editor may identify in changes 113 which element is to be changed. Thus, if the diagram element is to be moved, the editor would identify the current position of the element and the new (moved) position of the element. This is one example among many, many different changes that can be made. Accordingly, the example is intended merely to illustrate how changes 113 may be generated and should not be read as limiting the type or number or style of changes that can be made.

Method 200 also includes an act of determining, based on the received editing inputs, which changes are to be made to the data model data to enact the desired changes in the UI (act 230). For example, update determining module 115 may determine, based on received editing inputs 106 (and/or determined changes 113), which UI model updates 123 are to be made to data model data 121 (upon which UI 111 is built) to enact the desired changes in the UI. These UI model updates may comprise, for example, an indication of which elements are to be changed and by how much.

The UI model updates 123 may, at least in some cases, be transformed into UI changes using purely functional transformations. Because the UI is data-driven, data model data 121 may be changed in a purely functional transformation, without recompiling the UI or even stopping it to make the changes. In some embodiments, the UI model updates 123 indicating how the data model data 121 is to be transformed into UI changes 131 are data and can be changed, manipulated or transferred in the same way data is normally handled. Moreover, the data indicating how the data model data 121 is to be transformed into UI changes 131 may be mapped to a structured UI representation including text, a UI tree, a graphical diagram or any other type of structured UI representation.

In some embodiments, update determining module 115 may comprise a data flow engine. A data flow engine, as used herein, may refer to a software engine that supports functional composition and the use of queries for property-binding, repeated object construction, and conditional object construction. The data flow engine may be configured to receive and process functional application descriptions based on models. For instance, the data flow engine may be configured to process extensible markup language (XML) application foundation (XAF) applications or other functional application descriptions. Additionally or alternatively, the data flow engine may be configured to process queries constructed by the editors.

XAF, as used herein, is a software application framework for generating a runtime structure for a given software application and for managing execution of the software application. Applications may be generated by an application framework that includes a collection or graph of connected application components. Functionalities of an application configured according to the application framework are enabled by dynamically configuring groups of application components into component domains where each domain is configured to enable a given functionality of the application, for example, displaying a picture in a word processing document.

In order to generate a runtime structure for the application, an application may pass an application description for each piece of application functionality to an application description engine. The application description provides declarative rules for structuring and composing the component domains, and the application description engine is operative to interpret the declarative rules for creating and reconfiguring the component domains as required based on data events received by the application. Data events, as used herein, may be any type of software message, user input, or other indication that something has occurred that may affect the software application. Data events may occur, for example, when a user clicks a mouse to interact with the application, or when an error message is presented during processing of the application.

In some cases, XAF may be configured to track dependencies such that data evaluations and object graph constructions may be incrementally updated when data changes. For example, XAF may track dependencies in data such that a software application may be incrementally updated when the data is updated. In some embodiments, this incremental updating may be carried out automatically by a XAF engine (e.g. the data flow engine or update determining module 115).

Thus, in some embodiments, data model data 121 may comprises a schematized XAF application description. This XAF application description may, in turn, be interpreted by the XAF engine (or update determining module 115). Moreover, in some cases, at least one of the real-time incremental editors 110A/110B may be instantiated based on a XAF application description. It should be noted that while XAF engines and XAF application descriptions are provided as examples, any type of functional application description language or functional application description language engine may be used.

Method 200 includes an act of updating the UI in real-time based on the determined edits to the data model data (act 240). For example, runtime model interpreter 130 may receive UI model updates, interpret those model updates in real-time (or substantially real-time) and send the UI updates 131 back to the editor(s). These changes may be applied to the UI(s) dynamically in real-time, without stopping or recompiling the running UI. In some cases, only the minimal set of controls and properties (or other elements) are updated based on determined data dependencies. Accordingly, if update determining module 115 (or a data flow engine) determines that the determined data changes to element A, for example, affect elements C, D and F based on determined data dependencies, only elements A, C, D and F will be updated while the other elements will be left alone.

In instances where update determining module 115 comprises a data flow engine, the data flow engine may be configured to support transformations of collections, records and atoms (and any other forms of data model data) as well as track dependencies across data model data items. By tracking such data dependencies, the minimal set of elements to be changed may be discovered and other elements may be left unchanged. In another embodiment, a UI model interpreter may be instantiated to perform each the following steps in real-time: receive a declaratively defined UI model, interpret the UI model via functional transformation using the data flow engine and present the resulting UI to the user.

Returning to FIG. 2, method 200 includes an act of presenting the updated UI in essentially real-time without losing state information in the resultant UI (act 250). For example, running application 135 may present the visualized results of the updated UI 111 in essentially real-time without losing state information in the UI. Thus, if a user had previously selected a given element, that element would still be selected after the updates were dynamically applied. Moreover, it should be noted that wherever the terms real-time, essentially real-time or substantially real-time appear, these terms are referring to a short time frame and not to an instantaneous event. Accordingly, even in real-time, a delay may occur between the time an input is received and when that input is applied.

Figure 4:
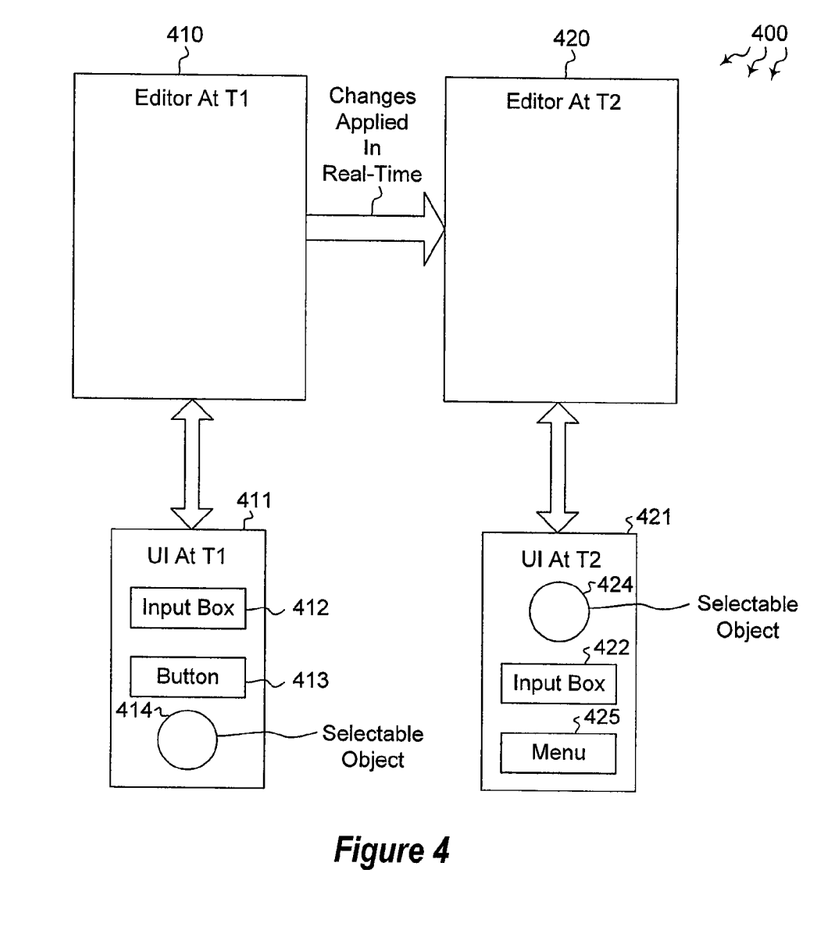
FIG. 4 illustrates an embodiment of the present invention in which a UI is dynamically updated.

One example of displaying the visualized results of the updated UI may be shown in environment 400 of FIG. 4. Environment 400 includes an editor and a corresponding UI shown at two different times (i.e. editor at time 1 (T1) 410 with corresponding UI at T2 411 and editor at time 2 (T2) 420 with corresponding UI at T2 421). Editor at T1 includes a UI 411 that has three items: input box 412, button 413 and selectable/draggable object 414. A user may indicate that selectable/draggable object 414 is to be moved to a position above input box 412, that button 413 is to be deleted and that a menu box is to be added. These changes may be applied incrementally or may be applied as a group. Accordingly, although not shown in FIG. 4, in the above example a user may see each edit incrementally applied to the UI essentially as soon as the edit has been input by the user. At time T2, UI 421 may appear with each of the above changes applied: selectable/draggable object 424 has been moved to its new location, input box 422 has been moved to a lower position, button 413 has been deleted and menu 425 has been added to the UI. This example is merely intended to show one example of how UI elements may be updated in real-time. In other embodiments, different elements, different applications and different numbers of elements may be used.

In this manner, a user's edits may be analyzed to determine which changes are to be made to the user interface (or other software application) and applied to the user interface in real-time, while the UI is running, without stopping the application and without losing state information. In a similar vein, the potential results of a user's edits may be previewed within an editor, as explained below with regard to method 300 of FIG. 3.

FIG. 3 illustrates a flowchart of a method 300 for presenting a preview of the potential results of a user edit to data model data. The method 300 will now be described with frequent reference to the components and data of environments 100 of FIG. 1 and 500 of FIG. 5.

Method 300 includes an act of instantiating a real-time incremental editor configured to receive editing inputs that are to be applied to data of a data model, wherein the data model data declaratively defines a UI model that drives the behavior of a corresponding UI based on the UI model (act 310). For example, a computer system may instantiate incremental real-time editor A (110A) which may be configured to receive editing inputs 106 that are to be applied to data 121 of data model 120. As described above, data model data 121 declaratively defines a UI model that drives the behavior of UI 111 which is based on the UI model. Because the UI model is declaratively defined, simple changes to the model data can be applied in real-time without having to recompile or even stop a running software application that is based on the data model.

Method 300 further includes an act of receiving an input from a user at the instantiated editor, the input indicating one or more edits that are to be applied to a running software application (act 320). For example, editor B (110B) may receive editing input 106 from user 105 indicating one or more desired edits that are to be made to the UI. These edits may comprise text edits, graphical edits or any other type of changes or modifications that can be made to UI 111.

Method 300 also includes an act of determining, based on the received user input, which changes are to be made to the data model data to enact the desired changes in the running software application (act 330). For example, update determining module 115 may determine, based on received editing inputs 106 (and/or determined changes 113), which UI model updates 123 are to be made to data model data 121 (upon which UI 111 is built) to enact the desired changes in the UI. These UI model updates may comprise, for example, an indication of which elements are to be changed and by how much.

Method 300 includes an act of previewing the determined changes in real-time on the running application (act 340). For example, running application 135 may be configured to preview the determined UI model updates 123 which are based on determined changes 113 which are in turn based on editing input 106. These UI model updates may be applied to a running UI by runtime model interpreter 130 which interprets the UI model (and changes thereto) at runtime and provides the actual UI updates which are displayed in the UI (111) of the running application (135). Thus, as a user applies inputs, the results of those inputs may be displayed in the running application.

Figure 5:
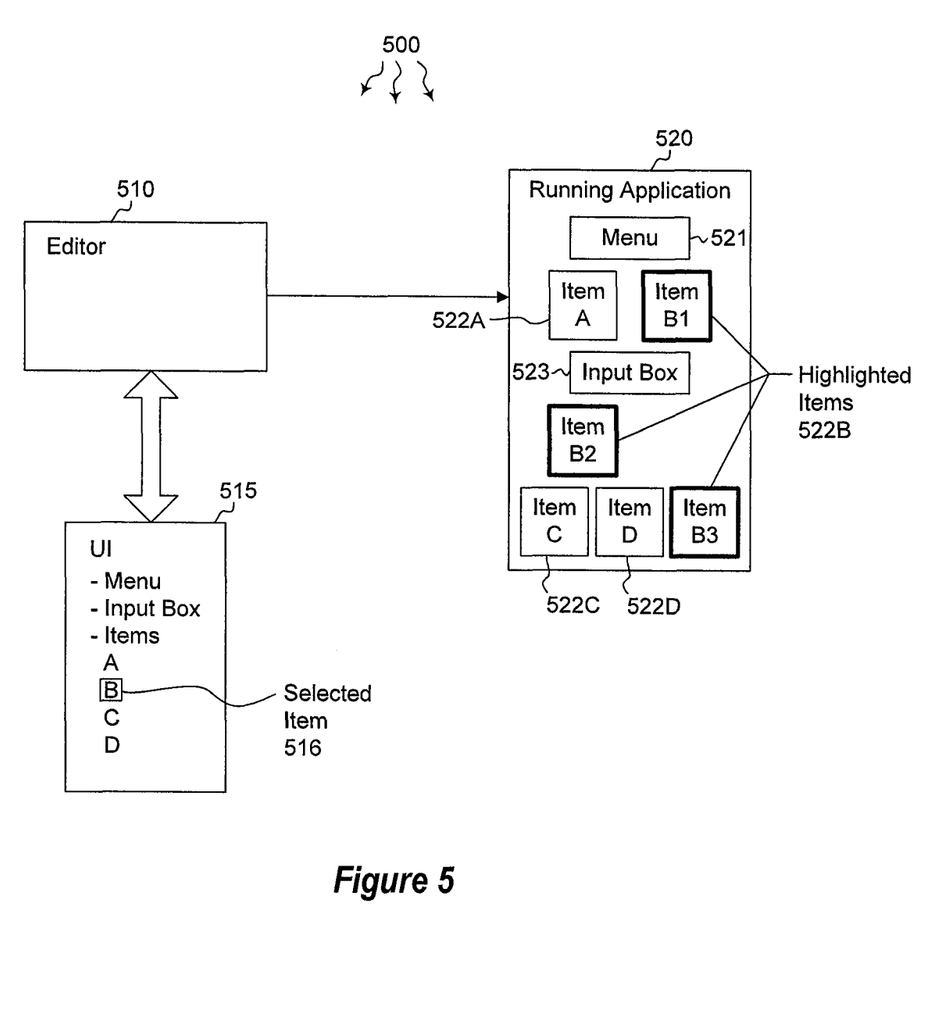
FIG. 5 illustrates an embodiment of the present invention in which selected elements are highlighted in a running application

In some embodiments, user 105 may select an element of the data model (i.e. a UI element) in the editor and the editor may display, in real-time, a highlight around each corresponding instance of the selected element on the running application. Accordingly, as shown in FIG. 5, editor 510 may present UI 515 to the user with various elements including a menu, input box and other items A, B, C and D. User 105 may select item B (i.e. selected item 516) and, upon selection, any corresponding items in the running application that are implemented based on item B may be highlighted. Thus, in running application 520, items B1, B2 and B3, each of which implement item B of UI 515, are highlighted. In this manner, the user can easily look at the running application and identify each of the items or areas where the selected item is being used. This can be helpful in debugging the running application. The other UI items of the running application (i.e. menu 521, item A 522A, item C 522C, item D 522D and input box 523 are not highlighted unless or until the item is selected in the editor.

The selected item may be identified within the running application using a query. Editor 510 may be configured to construct a query that is used to query for each instance of the selected element. The editor can then identify the items based on the response to the query. In some embodiments, a host environment may be configured to display the highlighting around each corresponding instance of the selected element on the running application. Additionally or alternatively, user inputs may be received at the editor that result in a new feature being added to the running software application. In such cases, the new features may be dynamically added to the running software application in real-time.

Accordingly, an environment may be provided in which a user may select a UI (or other) item and each corresponding instance of that selected item will be highlighted in the running application, without stopping and/or restarting the application. Moreover, a development environment may be provided where a user's editing inputs are analyzed to determine which changes are to be made to the user interface (or other software application) and are applied to the user interface in real-time, while the UI is running, without stopping the application and without losing state information.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system that includes one or more processors and system memory, a method for providing a real-time incremental editor for enacting changes to user interface (UI) elements of an active UI, the method comprising:

an act of the computer system presenting a first UI of an executing application program based on a UI model that includes declarative model data that drives the behavior of the first UI, the first UI including a plurality of UI elements, the UI model including particular declarative model data that declaratively defines a visual appearance of the plurality of UI elements of the first UI, each of the plurality of UI elements being an instance of the particular declarative model data;

an-act of the computer system visually indicating a state of the first UI, including visually indicating within the first UI that a particular UI element of the plurality of UI elements has been selected by a user at the first UI;

concurrent to presenting the first UI of the application program, and concurrent to visually indicating within the first UI that the particular UI element has been selected by a user:

an act of the computer system presenting a second UI of a real-time incremental editor that is separate from the application program and that is configured to receive one or more editing inputs that are to be applied to the particular declarative model data of the UI model, to edit the first UI of the application program while the application program is executing;

an act of the computer system receiving a first editing user input at the second UI of the real-time incremental editor, the first editing input selecting the particular declarative model data that declaratively defines the plurality of UI elements;

based on selection of the particular declarative model data within the real-time incremental editor, visually distinguishing each of the plurality of UI elements, including the particular UI element, within the first UI as being selected at the second UI of the real-time incremental editor, while also visually indicating within the first UI that the particular UI element has been selected at the first UI;

an act of the computer system receiving a second editing user input at the second UI of the real-time incremental editor, the second editing input indicating one or more desired edits that are to be made to the plurality of UI elements that affect the visual appearance of the plurality of UI elements within the first UI;

an act of the computer system determining, based on the received editing input, one or more changes that are to be made to the particular declarative model data corresponding to the plurality of UI elements in order to enact the one or more desired edits to each of the plurality of UI elements; and an act of the computer system updating the first UI to reflect the one or more desired edits to the plurality of UI elements, including:

preserving the state of the first UI to reflect the user selection of the particular UI element by continuing to visually indicate that the particular UI element has been selected by the user; and concurrent to continuing to visually indicate that the particular UI element has been selected by the user, altering the visual appearance of each of the plurality of UI elements, including the particular UI element, based on the one or more changes to the particular declarative model data corresponding to the plurality of UI elements.

2. The method of claim 1, wherein the one or more changes to the particular declarative model data are transformed into UI changes using purely functional transformations.

3. The method of claim 1, wherein the one or more changes to the particular declarative model data comprise data indicating how the particular declarative model data is to be transformed into UI changes.

4. The method of claim 3, wherein the data indicating how the particular declarative model data is to be transformed into UI changes is mapped to a structured UI representation including at least one of text, a UI tree and a graphical diagram.

5. The method of claim 1, wherein the declarative model data comprises a schematized XAF application description.

6. The method of claim 5, wherein at least one real-time incremental editor is instantiated based on the XAF application description.

7. The method of claim 1, wherein the declarative model data is divided into chunks based on corresponding portions of a UI tree.

8. The method of claim 1, wherein the declarative model data is divided into one or more text chunks.

9. The method of claim 8, further comprising applying a two-way data binding between a textual editor view and the text chunks of the data model data, such that any edits to the declarative model data cause the textual editor to update automatically.

10. The method of claim 8, wherein the text chunks are structured such that data model grammar that defines how the data is to be structured is not violated.

11. The method of claim 1, further comprising instantiating a data flow engine to support transformations of collections, records and atoms and track dependencies across declarative model data items.

12. The method of claim 11, further comprising implementing a UI model interpreter to perform the following in real-time: receive the declaratively defined UI model, interpret the UI model via functional transformation using the data flow engine and present the resulting UI to the user.

13. The method of claim 11, wherein the instantiated editors are configured to build queries which are processed by the data flow engine.

14. A computer program product for implementing a method for presenting a preview of the potential results of a user edit to data model data, the computer program product comprising one or more hardware storage devices having stored thereon computer-executable instructions that, when executed by one or more processors of a computing system, cause the computing system to perform the method, the method comprising:

an act of the computer system presenting first UI of an executing application program based on a UI model that includes declarative model data that drives the behavior of the first UI, the first UI including a plurality of UI elements, the UI model including particular declarative model data that declaratively defines a visual appearance of the plurality of UI elements of the first UI, each of the plurality of UI elements being an instance of the particular declarative model data;

an act of the computer system visually indicating a state of the first UI, including visually indicating within the first UI that a particular UI element of the plurality of UI elements has been selected by a user at the first UI;

concurrent to presenting the first UI of the application program, and concurrent to visually indicating within the first UI that the particular UI element has been selected by a user:

an act of the computer system presenting a second UI of a real-time incremental editor that is separate from the application program and that is configured to receive one or more editing inputs that are to be applied to the particular declarative model data of the UI model, to edit the first UI of the application program while the application program is executing;

an act of the computer system receiving a first editing user input at the second UI of the real-time incremental editor, the first editing input selecting the particular declarative model data that declaratively defines the plurality of UI elements;

based on selection of the particular declarative model data within the real-time incremental editor, visually distinguishing each of the plurality of UI elements, including the particular UI element, within the first UI as being selected at the second UI of the real-time incremental editor while also visually indicating within the first UI that the particular UI element has been selected at the first UI;

an act of the computer system receiving a second editing user input at the second UI of the real-time incremental editor, the second editing input indicating one or more desired edits that are to be applied to the plurality of UI elements that affect the visual appearance of the plurality of UI elements within the first UI;

an act of the computer system determining, based on the received editing input, one or more changes that are to be made to the particular declarative model data corresponding to the plurality of UI elements in order to enact the one or more desired edits to each of the plurality of UI elements; and an act of the computer system updating the first UI to reflect the one or more desired edits to the plurality of UI elements, including:

preserving the state of the first UI to reflect the user selection of the particular UI element by continuing to visually indicate that the particular UI element has been selected by the user; and concurrent to continuing to visually indicate that the particular UI element has been selected by the user, altering the visual appearance of each of the plurality of UI elements, including the particular UI element, based on the one or more changes to the particular declarative model data corresponding to the plurality of UI elements.

15. The computer program product of claim 14, wherein visually indicating that the particular UI element has been selected comprises drawing a highlight around the particular UI element on the first UI.

16. The computer program product of claim 15, further comprising an act of constructing a query that is used to query for each of the plurality of UI elements.

17. The computer program product of claim 14, further comprising:
an act of receiving user input at the second UI of the real-time incremental editor that result in a new feature being added to the first UI of the application program; and
an act of dynamically adding the new feature to the first UI of the application program in real-time.

18. A computer system comprising the following:
one or more processors;
system memory; and
one or more computer-readable storage media having stored thereon computer-executable instructions that, when executed by the one or more processors, causes the computing system to perform a method for providing a real-time incremental editor for enacting changes on an active user interface (UI), the method comprising the following:
presenting a first UI of an executing application program based on a UI model that includes declarative model data that drives the behavior of the first UI, the first UI including a plurality of UI elements, the UI model including particular declarative model data that declaratively defines a visual appearance of the plurality of UI elements of the first UI, each of the plurality of UI elements being an instance of the particular declarative model data;
visually indicating a state of the first UI, including visually indicating within the first UI that a particular UI element of the plurality of UI elements has been selected by a user at the first UI;
concurrent to presenting the first UI of the application program, and concurrent to visually indicating within the first UI that the particular UI element has been selected by a user:
presenting a second UI of a real-time incremental editor that is separate from the application program and that is configured to receive one or more editing inputs that are to be applied to the particular declarative model data of the UI model, to edit the first UI of the application program while the application program is executing;
receiving a first editing user input at the second UI of the real-time incremental editor, the first editing input selecting the particular declarative model data that declaratively defines the plurality of UI elements;
based on selection of the particular declarative model data within the real-time incremental editor, visually distinguishing each of the plurality of UI elements, including the particular UI element, within the first UI as being selected at the second UI of the real-time incremental editor, while also visually indicating within the first UI that the particular UI element has been selected at the first UI;
receiving a second editing user input at the second UI of the real-time incremental editor, the second editing input indicating one or more desired edits that are to be made to the plurality of UI elements that affect the visual appearance of the plurality of UI elements within the first UI;
determining, based on the received editing input, one or more changes that are to be made to the particular declarative model data corresponding to the plurality of UI elements in order to enact the one or more desired edits to each of the plurality of UI elements; and
updating the first UI to reflect the one or more desired edits to the plurality of UI elements, including:
preserving the state of the first UI to reflect the user selection of the particular UI element by continuing to visually indicate that the particular UI element has been selected by the user; and
concurrent to continuing to visually indicate that the particular UI element has been selected by the user, altering the visual appearance of each of the plurality of UI elements, including the particular UI element, based on the one or more changes to the particular declarative model data corresponding to the plurality of UI elements.

19. The method of claim 1, wherein the editing user input at the second UI of the real-time incremental editor is propagated to an additional incremental editor.

* * * * *